Patented Dec. 23, 1941

2,267,375

UNITED STATES PATENT OFFICE 2,267,375

PROCESS FOR THE PRODUCTION OF CARBONYL COMPOUNDS

Kenneth Johnson, Terre Haute, Ind., assignor to Purdue Research Foundation, Lafayette, Ind., a corporation of Indiana No Drawing. Application March 26, 1940, Serial No. 326,053

8 Claims. (Cl. 260—593)

My invention relates to a process for the production of carbonyl compounds, and more specifically to an improved process for the production of aldehydes and ketones from aliphatic nitrohydrocarbons.

It has been observed that aldehydes and ketones can be produced from nitroparaffins by subjecting alkali salts of the nitroparaffins to the action of acids. Yields up to 70% of the theoretical yield have been obtained by this process, (J. U. Nef, Ann. 288, 263). Although this reaction has been known since Nef's work in 1894, yields in excess of 70% have not been obtained up to the present time.

I have now discovered that improved yields of aldehydes and ketones can be obtained by effecting the reaction under conditions which prevent local alkalinity in the reaction mixture. The very pronounced effect of alkalinity in the reaction mixture may be seen from the fact that if acid is introduced into a solution of an alkali metal salt of a nitrohydrocarbon, practically no carbonyl compounds are formed; whereas, if the nitrohydrocarbon salt is slowly introduced into an acid solution, carbonyl compounds are produced. Even in this latter case, however, the yields may be seriously reduced by localized alkalinity in the reaction mixture.

I have found that the occurrence of local alkalinity in the reaction mixture may be inhibited to a large degree by employing a relatively high acid concentration, preferably utilizing a considerable excess of total acid over that required for the reaction, and by introducing the nitrohydrocarbon salt very slowly into the acid solution while thoroughly agitating the latter.

I have also found that local alkalinity in the reaction mixture may be minimized by employing nitrohydrocarbon salts of relatively weak bases rather than the alkali metal salts which have previously been employed. The alkaline earth metal salts of the nitrohydrocarbons, for example, are less basic than the alkali metal salts, and on introduction into an acid solution are less likely to create zones of local alkalinity.

An additional advantage of the use of the alkaline earth metal salts of the nitrohydrocarbons is the fact that if sulfuric acid is employed as the converting agent, the resulting alkaline earth metal sulfate is insoluble, and the unused sulfuric acid may then be recycled, making possible a continuous process.

My process is adapted for the production of carbonyl compounds from any of the aliphatic nitrohydrocarbon salts. Among these may be mentioned the salts of the nitroparaffins, such as nitroethane, 1-nitropropane, 2-nitrobutane, nitrohendecane, and the like, and of the nitrocycloparaffins, such as nitrocyclohexane. My process is particularly adapted for the production of aldehydes and ketones from the salts of the lower nitroparaffins, and especially those containing from 2 to 4 carbon atoms.

The alkaline earth metal salts of the nitrohydrocarbons may be prepared in accordance with known procedures, as, for example, by mixing the nitrohydrocarbon with an aqueous suspension of an alkaline earth metal hydroxide. The resulting aqueous suspension of the nitroparaffin salt may then be added directly to the acid solution, or the salt may be separated and added in anhydrous form. Alternatively, the salt may be dissolved in a suitable organic solvent, but in such case the solvent should be completely miscible with the acid solution in order to prevent localized alkalinity in the reaction mixture.

Any acid may be employed as the converting agent in my process, if it is sufficiently soluble in the reaction medium to produce a concentration sufficiently high to prevent localized alkalinity in the reaction mixture. Preferably, an acid should be employed which dissociates to a greater extent than the base from which the nitrohydrocarbon salt was formed. The strong mineral acids are very satisfactory in this respect, when employed with alkaline earth metal salts, and in view of their low cost it is unnecessary, from a practical standpoint, to attempt the use of organic acids. The concentration of the acid employed may vary over a relatively wide range, e. g., from 5%–95% by weight in the case of sulfuric acid. I prefer, however, to employ an acid concentration equivalent to at least 20% sulfuric acid by weight. Sufficient total acid should be present in the solution to constitute at least one equivalent per mole of the nitrohydrocarbon salt to be introduced into this solution, and in general I prefer to employ a considerable excess over this minimum. If a relatively weak acid is employed with a nitrohydrocarbon salt of a relatively strong base, a very large excess of acid should be used, and the reaction mixture should be very thoroughly agitated during the addition of the salt. In the case of a continuous process, of course, the rate of addition of acid to the reaction zone should be so proportioned to the rate of addition of the nitrohydrocarbon salt as to provide the desired excess of acid.

The reaction may be effected over a relatively wide temperature range, with apparently equal efficiency. The reaction proceeds rapidly at room temperatures, and I have also carried out the reaction at the boiling point of the reaction mixture. Operating outside of these limits would involve unnecessary expense, and is not therefore desirable from a practical standpoint. It is to be understood, however, that these are not to be taken as limiting temperatures for the operation of my process.

In carrying out my process in a single batch operation, an aqueous slurry of an alkaline earth metal salt of a nitrohydrocarbon may suitably be slowly added to a well agitated solution of sulfuric acid. Since the reaction is exothermic, nitrous oxide is evolved, and some of the carbonyl compound produced may be carried off with the nitrous oxide. To prevent this, the acid solution may be maintained at a low temperature, e. g., 0° C., or the reaction vessel may suitably be equipped with a reflux condenser. After all of the nitrohydrocarbon salt has been added, the resulting mixture may be filtered to remove the alkaline earth metal sulfate, and the carbonyl compound may then be recovered by known methods, for example, by distillation.

The above process may be adapted for continuous operation by continuously introducing into the reaction vessel an excess of sulfuric acid simultaneously with the introduction of the nitrohydrocarbon salt, continuously removing the resulting mixture from the vessel, filtering, distilling and continuously recycling the distillation residue as a part of the sulfuric acid introduced into the reaction vessel. Such a continuous process could, of course, be modified in numerous obvious ways, as, for example, by distilling prior to filtration, or by maintaining the reaction mixture at a sufficiently high temperature to distill the aldehydes or ketones directly from the reaction vessel. Any such modifications are, of course, to be considered as within the scope of my invention.

My invention may be further illustrated by the following specific examples:

*Example I*

Approximately 15 parts by weight of 1-nitrobutane was dissolved in approximately 50 parts by weight of a sodium hydroxide solution containing 8 parts by weight of sodium hydroxide. The resulting solution of the sodium salt of 1-nitrobutane was introduced into a sulfuric acid solution comprising approximately 18 parts by weight of concentrated sulfuric acid (sp. gr. 1.84), and 50 parts by weight of water. The butyraldehyde resulting from this reaction was recovered by distillation and determined by titration with hydroxylamine hydrochloride and back titration with standard alkali. A yield of 67% of the theoretical yield of butyraldehyde was obtained.

*Example II*

Approximately 15 parts by weight of 1-nitrobutane was dissolved in approximately 100 parts by weight of a sodium hydroxide solution containing 8 parts by weight of sodium hydroxide. The resulting salt solution was slowly added to a well-agitated sulfuric acid solution comprising 46 parts by weight of concentrated sulfuric acid, and 100 parts by weight of water. The yield of butyraldehyde was 79% of the theoretical yield.

*Example III*

Approximately 15 parts by weight of 1-nitrobutane was introduced into a suspension of 6 parts by weight of calcium oxide and 100 parts by weight of water, and the resulting mixture was agitated for a sufficient time to promote the formation of the calcium salt of 1-nitrobutane. The resulting suspension was slowly dropped into a sulfuric acid solution comprising 46 parts by weight of concentrated sulfuric acid and 150 parts by weight of water, which was maintained at approximately 0° C. The yield of butyraldehyde was 84% of the theoretical yield.

*Example IV*

The procedure of Example III was employed, utilizing 1-nitropropane in place of 1-nitrobutane. The yield of propionaldehyde was 79.5% of the theoretical yield.

*Example V*

The procedure of Example III was employed, utilizing nitroethane in place of 1-nitrobutane. The conversion of nitroethane to acetaldehyde was approximately 77%. The presence of unreacted nitroethane indicated a yield substantially higher than 77%.

*Example VI*

Approximately 15 parts by weight of 2-nitropropane was introduced into a suspension of approximately 7 parts by weight of calcium hydroxide and 100 parts by weight of water. The resulting suspension of the calcium salt of 2-nitropropane was slowly introduced into the sulfuric acid solution, comprising 46 parts by weight of concentrated sulfuric acid, and 150 parts by weight of water, which was maintained at approximately 0° C. The yield of acetone was 83.5% of the theoretical.

*Example VII*

Approximately 17 parts by weight of 2-nitrobutane was introduced into a suspension of approximately 7 parts by weight of calcium hydroxide and 75 parts by weight of water. The resulting suspension of the calcium salt of 2-nitrobutane was slowly introduced into a sulfuric acid solution comprising 46 parts by weight of concentrated sulfuric acid and 150 parts by weight of water. The yield of methyl ethyl ketone was 85.5% of the theoretical yield.

*Example VIII*

Approximately 26 parts by weight of nitrohendecane (boiling point 110–120° C./7 mm.) was introduced into an alcoholic solution of sodium hydroxide, comprising 5.7 parts by weight of sodium hydroxide, 50 parts by weight of ethyl alcohol, 7 parts by weight of water. The resulting solution was slowly introduced into an agitated sulfuric acid solution comprising 78 parts by weight of concentrated sulfuric acid, and approximately 125 parts by weight of ethyl alcohol. The yield of carbonyl compounds was approximately 40% of the theoretical yield.

*Example IX*

Approximately 150 parts by weight of nitrocyclohexane was introduced into a sodium hydroxide solution comprising 60 parts by weight of sodium hydroxide and 400 parts by weight of water. This mixture was heated to effect reaction, and after all of the nitrocyclohexane had dissolved, the resulting salt solution was cooled and slowly introduced into an agitated solution of sulfuric acid comprising approximately 370 parts by weight of concentrated sulfuric acid, and 500 parts by weight of water, which was maintained at approximately 0° C. The yield of cyclohexanone was approximately 71.5% of the theoretical yield.

It is to be understood, of course, that the above examples are merely illustrative, and do not limit the scope of my invention. As has previously been pointed out, other nitrohydrocarbon salts may be transformed into their corresponding carbonyl compounds, and acids other than sulfuric acid may be employed for this purpose. Other expedients for preventing substantial local alkalinity in the reaction mixture may also be used. In general it may be said that the use of any equivalents or any modifications of procedure, which would naturally occur to those skilled in the art, is included within the scope of my invention.

My invention now having been described, what I claim is:

1. A process for the production of a carbonyl compound comprising introducing a nitro-hydrocarbon salt into an acid solution, the acid being sufficiently soluble in the reaction medium to produce an acid concentration sufficiently high to prevent localized alkalinity in the reaction mixture where the reaction is occurring.

2. In a process for the production of a carbonyl compound by the introduction of a nitrohydrocarbon salt into an acid solution, the improvement which comprises maintaining the rate of introduction of nitrohydrocarbon salt sufficiently low, and the acid concentration and rate of agitation sufficiently high to prevent substantial local alkalinity in the reaction mixture.

3. In a process for the production of a carbonyl compound from a nitroparaffin, the steps which comprise introducing a salt of a nitroparaffin into an acid solution of a concentration at least equivalent to 20% sulfuric acid, containing an excess of acid over that required to react with said nitroparaffin salt, and maintaining the rate of introduction of said nitroparaffin salt sufficiently low, and the rate of agitation sufficiently high to prevent substantial local alkalinity in the reaction mixture.

4. In a process for the production of a carbonyl compound from a nitrohydrocarbon, the step which comprises introducing an alkaline earth metal salt of a nitrohydrocarbon into an acid solution.

5. In a process for the production of a carbonyl compound from a nitroparaffin, the steps which comprise introducing an alkaline earth metal salt of a nitroparaffin into a solution of a strong mineral acid and maintaining the rate of introduction of said nitroparaffin salt sufficiently low, and the acid concentration and rate of agitation sufficiently high, to prevent substantial local alkalinity in the reaction mixture.

6. In a process for the production of a carbonyl compound from a nitroparaffin, the step which comprises introducing an alkaline earth metal salt of a nitroparaffin into an acid solution of a concentration at least equivalent to 20% sulfuric acid.

7. In a process for the production of a carbonyl compound selected from the group consisting of aldehydes and ketones from a nitroparaffin containing from 2 to 4 carbon atoms, the steps which comprise introducing the calcium salt of said nitroparaffin into a sulfuric acid solution of at least 20% concentration by weight containing an excess of acid over that required to react with said nitroparaffin salt, and maintaining the rate of introduction of said salt sufficiently low, and the rate of agitation sufficiently high to prevent substantial local alkalinity in the reaction mixture.

8. A continuous process for the production of a carbonyl compound from a nitrohydrocarbon, which comprises introducing an alkaline earth metal salt of said nitrohydrocarbon into a sulfuric acid solution, separating the resulting carbonyl compound and alkaline earth metal sulfate, and recycling the residual sulfuric acid solution.

KENNETH JOHNSON.